United States Patent
Berens et al.

(10) Patent No.: US 7,356,228 B1
(45) Date of Patent: Apr. 8, 2008

(54) FIBER OPTIC CABLE SYSTEMS AND METHODS INCORPORATING A LUMINESCENT COMPOUND-CONTAINING LAYER TO IDENTIFY CRACKS

(75) Inventors: Jessica R. Berens, Rochester, MN (US); Lad W. Freitag, Rochester, MN (US); Joseph Kuczynski, Rochester, MN (US); Fraser A. Syme, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/622,799

(22) Filed: Jan. 12, 2007

(51) Int. Cl.
G02B 6/44 (2006.01)

(52) U.S. Cl. ............... 385/100; 385/124; 385/126; 356/73.1

(58) Field of Classification Search ............. 385/100, 385/102, 107, 124, 126–128, 139; 356/73.1
See application file for complete search history.

(56) References Cited

U.S. PATENT DOCUMENTS

| | | | |
|---|---|---|---|
| 4,374,608 A * | 2/1983 | Anderson | 385/113 |
| 4,623,218 A * | 11/1986 | Laurette et al. | 385/101 |
| 5,387,791 A | 2/1995 | Weiss | |
| 5,499,313 A * | 3/1996 | Kleinerman | 385/123 |
| 6,108,475 A | 8/2000 | Chapin | |
| 6,654,513 B1 | 11/2003 | Liden et al. | |
| 6,798,956 B2 | 9/2004 | Morrison | |
| 7,245,800 B1 * | 7/2007 | Uhlhorn | 385/24 |
| 2004/0170371 A1 * | 9/2004 | Arkhipov et al. | 385/141 |
| 2004/0190841 A1 * | 9/2004 | Anderson et al. | 385/100 |
| 2005/0244116 A1 * | 11/2005 | Evans | 385/110 |
| 2006/0183241 A1 * | 8/2006 | Lehmann et al. | 436/164 |

FOREIGN PATENT DOCUMENTS

JP 02-181668 7/1990

* cited by examiner

Primary Examiner—Brian Healy
Assistant Examiner—Hung Lam
(74) Attorney, Agent, or Firm—Cantor Colburn LLP

(57) ABSTRACT

Fiber optic cable systems and methods incorporating a luminescent compound-containing layer to identify cracks. Exemplary embodiments include a fiber optic cable apparatus including a core for receiving laser light emitted from a VCSEL for the detection of faults in the fiber optic cable, a cladding disposed around the core, the cladding having an index of refraction differential with the core thereby allowing containment of light within the core by total internal reflection within the core, a buffer disposed around the cladding, the buffer capable of receiving LED emitted light for the detection of faults in the fiber optic cable, a braiding layer disposed around the buffer and configured to allow LED light to transmit from the buffer, and a jacket disposed around the braiding layer, the jacket having optical properties to receive LED light transmitted down the buffer in response to VCSEL, light having been unsuccessfully transmitted down the core.

7 Claims, 3 Drawing Sheets

FIBER OPTIC CABLE SYSTEMS AND METHODS INCORPORATING A LUMINESCENT COMPOUND-CONTAINING LAYER TO IDENTIFY CRACKS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to fiber optic cables, and particularly to fiber optic cable systems and methods incorporating a luminescent polymer to identify cracks to users without aid.

2. Description of Background

Current fiber optic cables are used in applications relating to information technology. Network and computer manufacturers may also utilize fiber cables in development, performance design and manufacturing applications. When these cables go faulty due to numerous reasons, identification of the bad cable, when bundled together with many other cables, is a time consuming, often tedious process.

Current transceiver (Tx) assemblies are shipped with a loss-of-light diagnostic feature that enables the host to identify a faulty cable. However, this feature only identifies the receiving end of the cable—it cannot identify the cable along its entire length. Therefore, it cannot identify a faulty cable in a bundle of cables, thereby rendering its utility somewhat limited.

Therefore, there exists a need for fault isolation on bundled fiber optic cables, which requires minimal intervention from people or hardware.

SUMMARY OF THE INVENTION

Exemplary embodiments include a fiber optic cable apparatus for self-detecting faults in the fiber optic cable, the apparatus including a core for receiving laser light emitted from a vertical cavity surface emitting laser (VCSEL) laser source as a testing diagnostic for the detection of faults in the fiber optic cable, a cladding disposed around the core, the cladding having an index of refraction differential with the core thereby allowing containment of light within the core by total internal reflection within the core, a buffer disposed around the cladding, the buffer for receiving light emitting diode (LED) emitted light as a testing diagnostic for the detection of faults in the Fiber optic cable, a braiding layer disposed around the buffer for allowing LED light to transmit from the buffer, and a jacket disposed around the braiding layer, the jacket having optical properties to receive LED light transmitted down the buffer in response to VCSEL light having been unsuccessfully transmitted down the core.

Further embodiments include a fiber optic cable fault detection system, including a fiber optic cable, including a core for receiving laser light emitted from a VCSEL, laser source as a testing diagnostic for the detection of faults in the fiber optic cable, a cladding disposed around the core, the cladding having an index of refraction differential with the core thereby allowing containment of light within the core by total internal reflection within the core, a buffer disposed around the cladding, the buffer for receiving LED emitted light as a testing diagnostic for the detection of faults in the fiber optic cable, a braiding layer disposed around the buffer for allowing LED light to transmit from the buffer, a jacket disposed around the braiding layer, the jacket having optical properties to receive LED light transmitted down the buffer in response to VCSEL light having been unsuccessfully transmitted down the core, a VCSEL coupled to the fiber optic cable to provide laser light for transmission down the core as an initial diagnostic tool for reception of the laser light at the terminal end by a detector, the VCSEL further providing LED light for transmission down the buffer for visible detection through the jacket and a general purpose computer for providing instructions to the VCSEL to transmit the laser light and the LED light, wherein the general purpose computer is further configured to provide instructions to the detector to detect the laser light and the LED light, and further configured to acquire data from the detector, the data related to the detection of the laser light and the LED light.

Exemplary embodiments further include a fiber optic cable fault detection method, including obtaining a fiber optic cable suspected of having a fault, the fiber optic cable having a core for receiving laser light emitted from a VCSEL, laser source as a testing diagnostic for the detection of faults in the fiber optic cable, a cladding disposed around the core, the cladding having an index of refraction differential with the core thereby allowing containment of light within the core by total internal reflection within the core, a buffer disposed around the cladding, the buffer for receiving LED emitted light as a testing diagnostic for the detection of faults in the fiber optic cable, a braiding layer disposed around the buffer for allowing LED light to transmit from the buffer, a jacket disposed around the braiding layer, the jacket having optical properties to receive LED light transmitted down the buffer in response to VCSEL, light having been unsuccessfully transmitted down the core, optically coupling the fiber optic cable to the VCSEL laser source at a source end of the fiber optic cable, optically coupling a detector at a terminal end of the fiber optic cable, transmitting laser light down the core of the fiber optic cable, detecting the laser light in the detector, placing the VCSEL, in a loss-of-light mode in response to unsuccessfully receiving the laser light at the detector, transmitting LED light down the buffer and detecting the LED light along the length of the fiber optic cable.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Exemplary embodiments include systems and methods that provide an integrated solution to the fiber cable design to "self-identify" when a break or damage is detected on the fiber optic cable, with minimal user intervention and/or external hardware. In general, during analysis of faulty cables, no infrastructure downtime is experienced because no cable isolation or disconnection is required. In typical implementations, a light emitting diode (LED) is used to allow the cable to identify itself. As such, individual cables or cables in a bundle can be readily identified.

Figure 1:
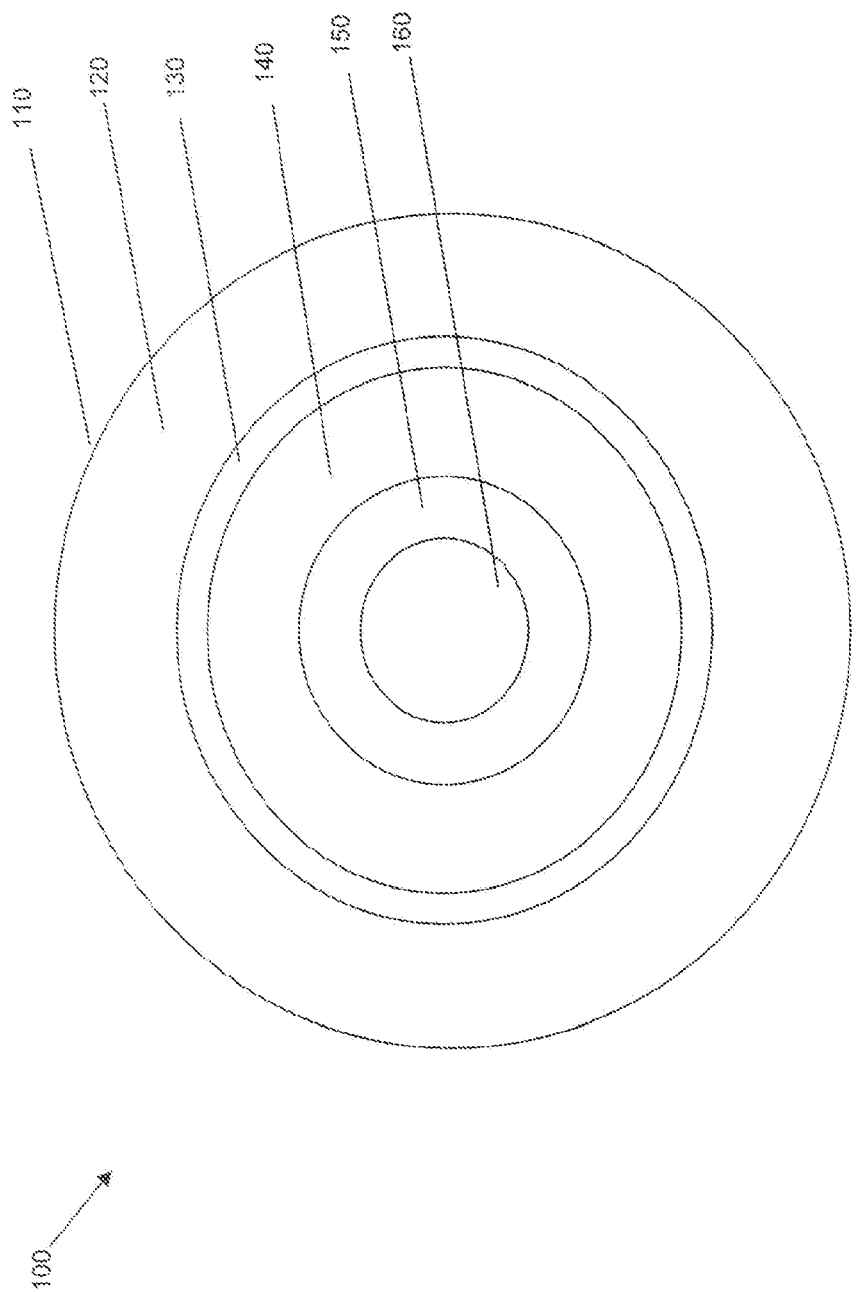
FIG. 1 illustrates an exemplary embodiment of a cross-section of a fiber optic cable incorporating a luminescent polymer layer to identify cracks.

FIG. 1 illustrates an exemplary embodiment of a fiber optic cable 100 incorporating a luminescent polymer layer to identify cracks. Fiber optic cable 100 includes core 160. Core 160 can be in the range of 50 μm to 62.5 μm in diameter and can be a Multi-Mode Fiber: MMF. In another implementation, core 160 can be about 8-10 μm in diameter and can be a Single-Mode Fiber (SMF). Core 160 is surrounded with cladding 150, which can be about 124-126 μm in diameter. As understood by those skilled in the art, light travels down core 160 and is contained (through index of refraction differences) by cladding 150. For protection, cladding 150 is surrounded by buffer 140, which can be in the range of 900 μm in diameter. Though not its main purpose, buffer 140 also helps to contain the light. Buffer 140 is surrounded by braided layer 130, which can be Kevlar®. Braided layer 130 provides conduit pull strength. Braided layer 130 is surrounded by jacket (plastic coating) 110. Jacket 110 can be in the range of 2.8 mm to 3.0 mm in diameter. In other implementations, jacket 110 can be in the range of 1.6 mm to 1.7 mm. Prior art jackets are typically orange for MMF and yellow for SMF.

In one exemplary embodiment, the currently orange or yellow jackets are replaced by transparent jacket 110. In an exemplary implementation, transparent jacket 110 can receive LED light during a test mode for detection in the event of a fault of the cable 100. In another exemplary embodiment, jacket 110 can be further embedded with luminescent compound 120 distributed throughout jacket 110. In another exemplary implementation, as discussed further in the description below, luminescent compound can be excited by an LED output to generate a fluorescence or phosphorescence. In general, in the implementations as discussed above, it is desirable that sufficient spacing exists within braid layer 130. The first option entails minimal change to current fiber optic cable fabrication processes, that is, the current yellow or orange jacket (PVC material) is merely replaced with transparent PVC and applied in an identical fashion. In the second implementation, a small amount of lumiphore is incorporated into the existing PVC formulation. It is appreciated that there are numerous suitable materials that can be implemented as the lumiphore. Since the lumiphore selected would be one of very high quantum yield, loading levels would be quite low. However, in this case, the output from the LED is selected in order to prevent ambient lighting from triggering the luminescence. Furthermore, if a red LED were determined to be necessary, appropriate eyewear might be required to view the luminescence, due to the fact that the luminescence is shifted to longer wavelengths than the eye can detect.

Figure 2:
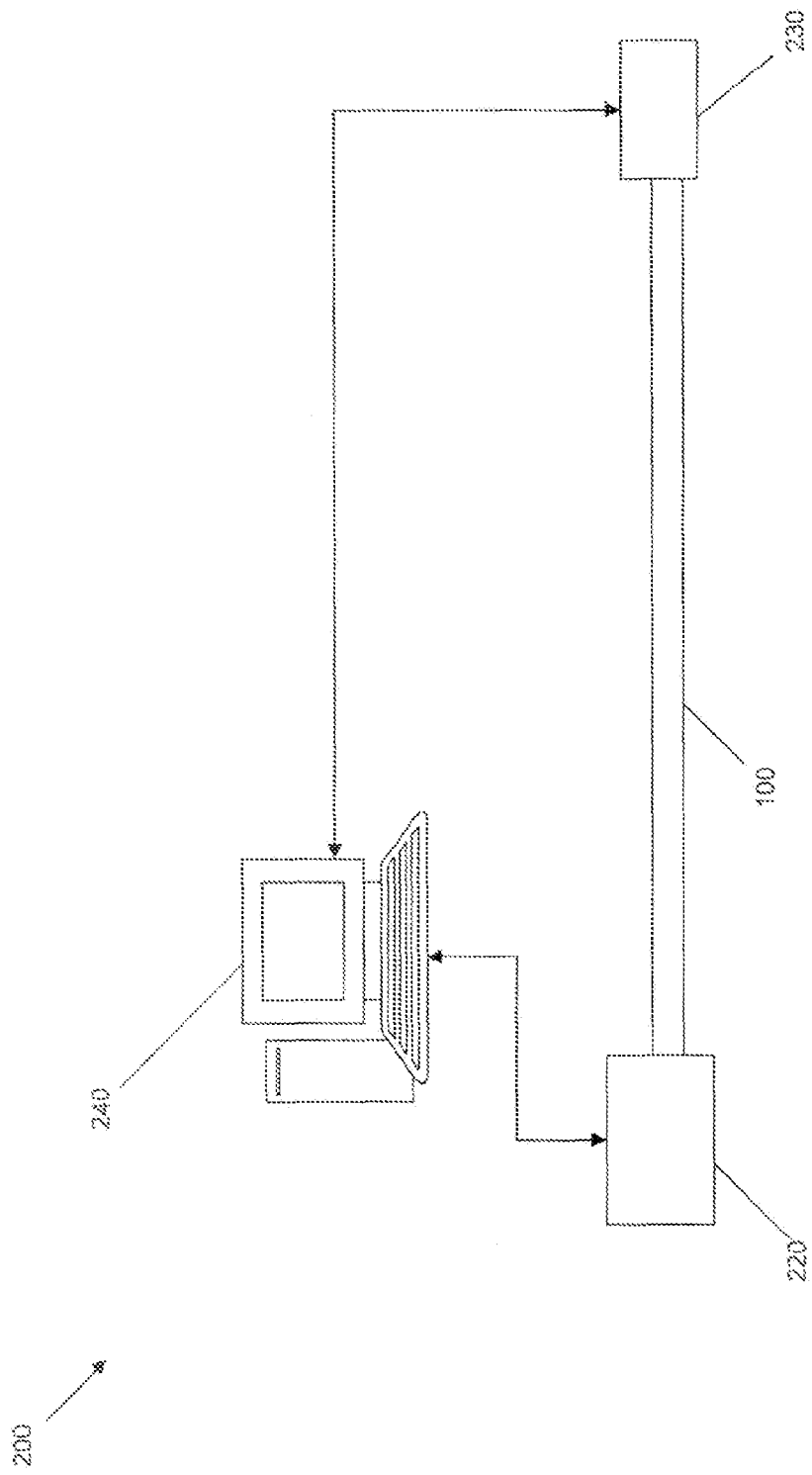
FIG. 2 illustrates an exemplary system for the identification of faults in fiber optic cables.

FIG. 2 illustrates an exemplary system 200 for the identification of faults in fiber optic cables. System 200 includes fiber optic cable 100 as discussed in the description above. Fiber optic cable 100 can be optically coupled to laser 220 such as a VCSEL. As known by those skilled in the art, a VCSEL's circular beam is easy to couple with fiber optic cable 100. In an exemplary implementation, laser 220 is capable of operating in laser light mode in which laser light can be launched down core 160 of fiber optic cable 100. In another exemplary implementation, laser 220 is capable of operating in an LED light mode in which laser 220 launches LED light down the entire cross-section of fiber optic cable 100. System 200 further includes detector 230 optically coupled to fiber optic cable 100 at the terminal end of fiber optic cable 100. Detector 230 can detect the laser light from core 160 when laser 220 successfully transmits light down core 160. System 200 further includes general purpose computer 240 coupled to both laser 220 and detector 230. General purpose computer 240 can provide instructions to laser 220 to generate both laser light and LED light as discussed above. General purpose computer 240 can also provide instructions to laser 220 to operate in LED mode in the event that detector 230 detects a loss-of-light state.

Figure 3:
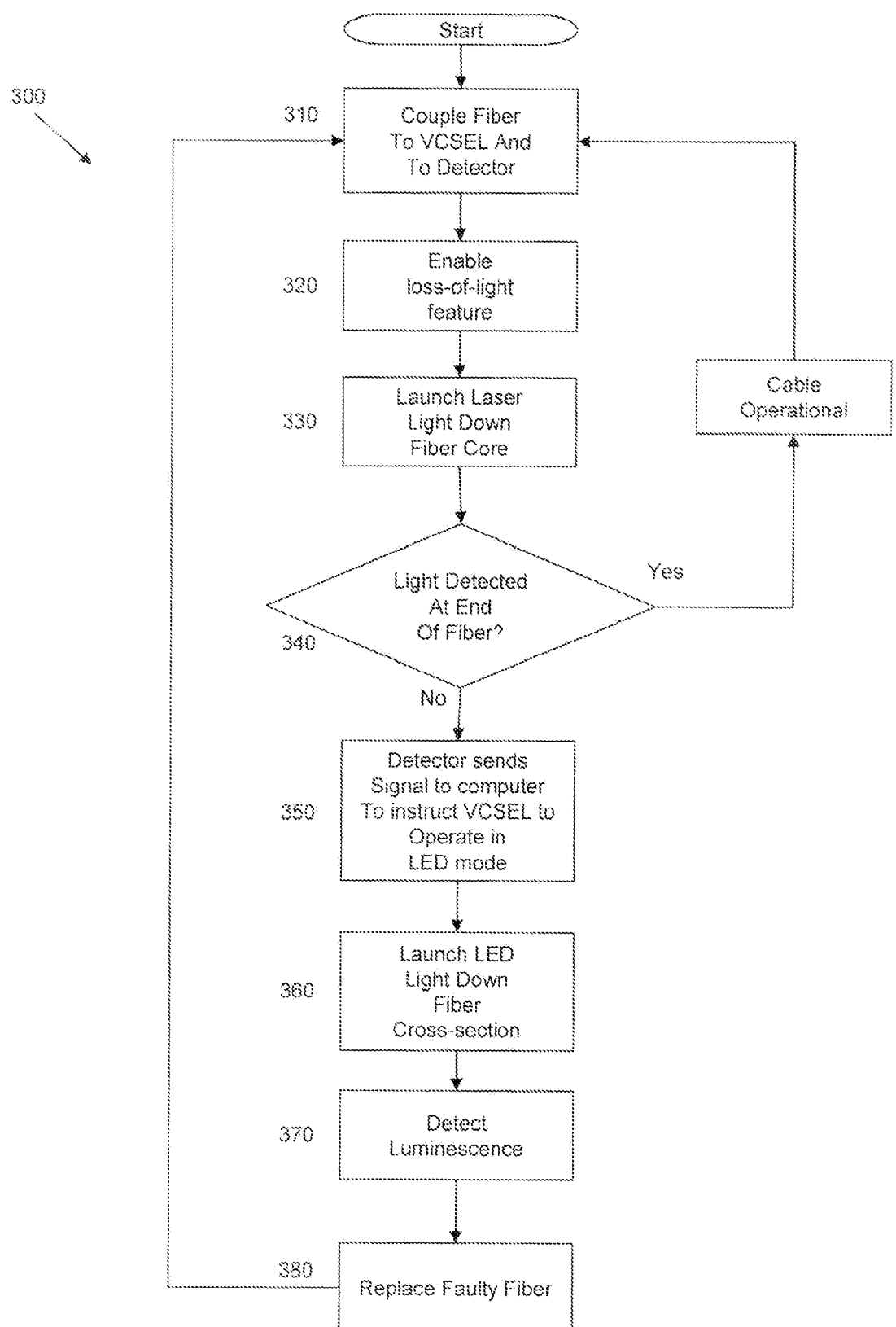
FIG. 3 illustrates an exemplary process for the identification of faults in fiber optic cables.

FIG. 3 illustrates an exemplary process for the identification of faults (e.g., cracks, etc.) in fiber optic cable 100. At step 310, fiber optic cable 100 is coupled to VCSEL 220 and the terminal end is connected to detector 230. At step 320, the loss-of-light feature is enabled. At step 330, laser light from VCSEL, 220 is launched down fiber core 160 of fiber 100. At step 340, it is determined whether or not the laser light is detected at the terminal end of fiber 100 using detector 230. If laser light is detected, fiber optic cable 100 is deemed operational and the process is looped back to step 310. If laser light is not detected at step 340, detector 230 transmits a signal to general purpose computer 240 which then instructs VCSEL 220 to operate in LED mode (step 350). At step 360, LED light is launched down the fiber cross-section. At step 370, LED light excites the photoactive compound 120 which subsequently luminesces and is visibly detected. It is appreciated that the light emitted can be selected to be any of a number of colors. Since buffer 140 is not designed to capture the incident light via total internal reflection, a fraction of the LED input is lost to the surrounding medium. As such, fiber optic cable jacket 110 can provide two different structures allowing visible detection of the LED mode in two separate exemplary implementations. At step 380, the faulty fiber cable 100 is replaced and the process resets at step 310.

In one implementation, jacket 110 can be transparent. By being transparent, LED light is readily visible through transparent jacket 110 of the cross-section of cable 100. In another exemplary implementation, jacket 110 includes luminescent compound 120. Upon excitation with the LED output of laser 220, fluorescence or phosphorescence of luminescent compound 120 can be visibly detected.

In another embodiment, the user intervenes and disconnects the faulty fiber optic cable 100 from the Tx assembly (laser 220 and detector 230). The fiber optic cable 100 is then inserted into a portable battery-powered, high intensity LED which launches a signal into the cable cross-section.

As discussed above, a luminescent material can be implemented in jacket 110. Such luminescent material can include, by way of example: pyrromethene dyes, squaraines, semiconductor nanocrystals, Ir(ppy)$_3$(ppy=2-phenylpyridine), and Tris(8-hydroxyquinoline)alminium(III)(Alq$_3$). In alternate embodiments, cladding 150 can be modified to yield a glass that luminesces upon direct excitation with the laser/LED output. Such glasses can include by way of example: Nd$_3^+$-doped tellurite glass TeO$_2$—TiO$_2$—Nb$_2$O$_5$, and Cr$_4^+$-doped silica.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A fiber optic cable fault detection method, comprising:
    obtaining a fiber optic cable suspected of having a fault, the fiber optic cable having a core for receiving laser light emitted from a light-emitting source as a testing diagnostic for the detection of faults in the fiber optic cable, a cladding disposed around the core, the cladding having an index of refraction differential with the core thereby allowing containment of light within the core by total internal reflection within the core, a buffer disposed around the cladding, the buffer capable of receiving LED emitted light as a testing diagnostic for the detection of faults in the fiber optic cable, a braiding layer disposed around the buffer and configured to allow LED-emitted light to transmit from the buffer, a jacket disposed around the braiding layer, the jacket having optical properties to receive LED-emitted light transmitted down the fiber cross-section in response to light emitted from the light-emitting source having been unsuccessfully transmitted down the core;
    optically coupling the fiber optic cable to the light-emitting source at a source end of the fiber optic cable;
    optically coupling a detector at a terminal end of the fiber optic cable;
    transmitting light emitted from the light-emitting source down the core of the fiber optic cable;
    detecting the light emitted from the light-emitting source in the detector;
    placing the light emitting source in a loss-of-light mode in response to unsuccessfully receiving the light emitted from the light-emitting source at the detector;
    transmitting LED-emitted light down the fiber cross-section; and
    detecting the LED-emitted light along the length of the cable.

2. The method as claimed in claim 1 wherein detecting the LED-emitted light along the length of the cable comprises detecting visible light from a transparent jacket of the fiber optic cable.

3. The method as claimed in claim 2 wherein the LED-emitted light is in the visible spectrum.

4. The method as claimed in claim 1 wherein detecting the LED-emitted light along the length of the cable comprises detecting an emission of a luminescent compound disposed in the jacket of the fiber optic cable.

5. The method as claimed in claim 4 wherein the emission is at least one of fluorescence or phosphorescence.

6. The method as claimed in claim 1 wherein the loss-of-light mode is generated by a general purpose computer coupled to the light-emitting source and the detector.

7. The method as claimed in claim 6 wherein the general purpose computer includes instructions to:
    generate laser light from the light-emitting source for transmission down the core and detection of the transmitted emitted from the light-emitting source light at the detector;
    configure the light-emitting source to generate LED-emitted light for transmission down the fiber cross-section in response to the unsuccessful reception of the laser light down the core at the detector; and
    acquire data related to the transmitted light emitted from the light-emitting source.

* * * * *

UNITED STATES PATENT AND TRADEMARK OFFICE
CERTIFICATE OF CORRECTION

| | |
|---|---|
| PATENT NO. | : 7,356,228 B1 |
| APPLICATION NO. | : 11/622799 |
| DATED | : April 8, 2008 |
| INVENTOR(S) | : Jessica R. Berens et al. |

Page 1 of 1

It is certified that error appears in the above-identified patent and that said Letters Patent is hereby corrected as shown below:

On the title page, item (75)

Inventor "Lad W. Freitag" should be --Ladd W. Freitag--

Signed and Sealed this
Tenth Day of April, 2012

David J. Kappos
*Director of the United States Patent and Trademark Office*